US009789902B1

(12) United States Patent
Cui et al.

(10) Patent No.: US 9,789,902 B1
(45) Date of Patent: Oct. 17, 2017

(54) SIMULTANEOUS MANUVERING SYSTEM FOR VEHICLES

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

(*) Notice: Subject to any disclaimer, the term of this patent is extended or adjusted under 35 U.S.C. 154(b) by 0 days.

(21) Appl. No.: 15/480,300

(22) Filed: Apr. 5, 2017

(51) Int. Cl.
  *B62D 7/14* (2006.01)
  *B60G 11/16* (2006.01)
  *B60G 17/015* (2006.01)
  *B62D 7/15* (2006.01)

(52) U.S. Cl.
  CPC ............ *B62D 7/144* (2013.01); *B60G 11/16* (2013.01); *B60G 17/015* (2013.01); *B62D 7/1536* (2013.01); *B62D 7/1545* (2013.01); *B60G 2202/10* (2013.01); *B60G 2202/41* (2013.01); *B60G 2202/422* (2013.01); *B60G 2202/442* (2013.01)

(58) Field of Classification Search
  CPC ....... B62D 7/144; B60G 11/16; B60G 17/015
  See application file for complete search history.

(56) References Cited

U.S. PATENT DOCUMENTS

| 3,016,966 | A | | 1/1962 | Hansen |
| 3,198,541 | A | * | 8/1965 | Christenson ......... B62D 7/1509 180/409 |
| 3,337,230 | A | | 8/1967 | Golding |
| 4,257,619 | A | | 3/1981 | Fisher |
| 4,664,213 | A | | 5/1987 | Lin |
| 5,090,512 | A | | 2/1992 | Mullet et al. |
| 5,139,279 | A | | 8/1992 | Roberts |
| 5,623,818 | A | | 4/1997 | Ledbetter |
| 5,727,644 | A | | 3/1998 | Roberts et al. |
| 5,752,710 | A | * | 5/1998 | Roberts .................. A61G 5/046 180/234 |

(Continued)

FOREIGN PATENT DOCUMENTS

| CN | 201580464 U | 9/2010 |
| CN | 103921616 A | 7/2014 |

(Continued)

OTHER PUBLICATIONS

"Jeep Hurricane Steering," *HowStuffWorks*, 2005. http://auto.howstuffworks.com/jeep-hurricane2.htm (Last Access on Feb. 27, 2017) 4pgs.

(Continued)

*Primary Examiner* — Joseph M Rocca
*Assistant Examiner* — Michael R Stabley
(74) *Attorney, Agent, or Firm* — Richard C. Litman

(57) ABSTRACT

The simultaneous maneuvering system includes a base, a plurality of wheel assemblies including at least one wheel rotatably mounted to the base, a plurality of steering rotors rotatably mounted to the base and the wheel assemblies, and a drive assembly having a drive frame coupled to each of the rotors. Operation of the drive assembly causes simultaneous rotation of the rotors and, thereby, positions the wheel of each corresponding wheel assembly in a desired direction.

14 Claims, 10 Drawing Sheets

(56) References Cited

U.S. PATENT DOCUMENTS

| | | | |
|---|---|---|---|
| 6,231,060 B1 | 5/2001 | Grenader et al. | |
| 6,675,820 B2 | 1/2004 | Balan | |
| 7,065,827 B2 | 6/2006 | Hsiao | |
| 7,810,823 B2 | 10/2010 | Van Mill et al. | |
| 8,590,664 B2 * | 11/2013 | Terashima | A61G 5/046 |
| | | | 180/411 |
| 8,944,448 B2 * | 2/2015 | Maeda | A61G 5/046 |
| | | | 280/93.506 |
| 9,228,649 B1 | 1/2016 | Cui et al. | |
| 9,555,679 B2 | 1/2017 | Pezza | |
| 2004/0007414 A1 | 1/2004 | Sugata | |
| 2005/0236208 A1 | 10/2005 | Runkles et al. | |
| 2013/0081499 A1 | 4/2013 | Maeda et al. | |

FOREIGN PATENT DOCUMENTS

| | | |
|---|---|---|
| CN | 104773043 A | 7/2015 |
| CN | 204488375 U | 7/2015 |
| JP | 2001-238919 | 9/2001 |
| WO | WO 2015/147697 A1 | 10/2015 |

OTHER PUBLICATIONS

Loureiro, "Manta Amphibious Electric Vehicle," http://www.tuvie.com/manta-amphibious-electric-vehicle-by-david-cardoso-loureiro/ (Last Access on Feb. 27, 2017) 3pgs.

"Universal Caster Box," https://www.grainger.com/product/COT-TERMAN-Universal-Caster-on-24KH32 (Last Access on Feb. 28, 2017) 5pgs.

\* cited by examiner

# SIMULTANEOUS MANUVERING SYSTEM FOR VEHICLES

BACKGROUND OF THE INVENTION

1. Field of the Invention

The present invention relates to steering systems, and particularly to a simultaneous maneuvering system for vehicles.

2. Description of the Related Art

Typically all-wheeled steering systems of vehicles provides a much smaller turning radius than conventional steering from two front wheels. As such, many conventional all-wheeled systems are inadequate in various circumstances, e.g., in narrow aisles of a warehouse where space for maneuvering is limited. Maneuvering in such confined spaces constitutes an awkward and tedious jig-jog action of inching a vehicle back and forth to change travel direction since the wheels may be moving in different directions. Other deficiencies that exist in conventional all-wheeled steering systems include the inability to properly control speed, parking, and the self-center rotation of the entire structure.

Thus, a simultaneous maneuvering system for vehicles solving the aforementioned problems is desired.

SUMMARY OF THE INVENTION

The simultaneous maneuvering system includes a base, a plurality of wheel assemblies including at least one wheel rotatably mounted to the base, a plurality of steering rotors rotatably mounted to the base and the wheel assemblies, and a drive assembly having a drive frame coupled to each of the rotors. Operation of the drive assembly causes simultaneous rotation of the rotors and, thereby, positions the wheel of each corresponding wheel assembly in a desired direction.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

FIGS. 1A-6 depict various embodiments of a simultaneous maneuvering system (hereinafter referred to as the "SMS") for vehicles according to the present teachings.

Figure 1A:
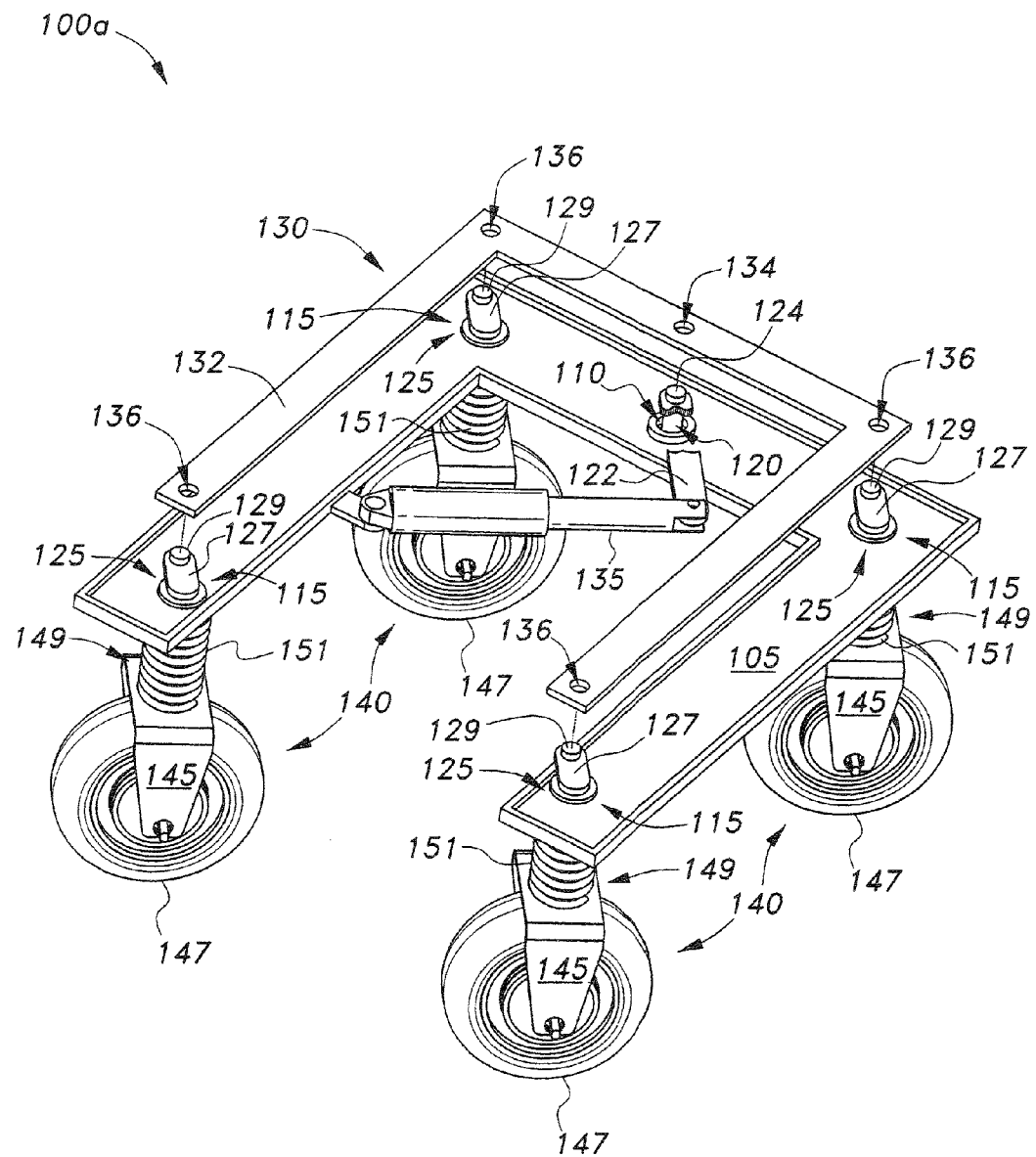
FIG. 1A is an environmental, perspective view of a first embodiment of a simultaneous maneuvering system having a linear actuator, according to the present invention.
Figure 1B:
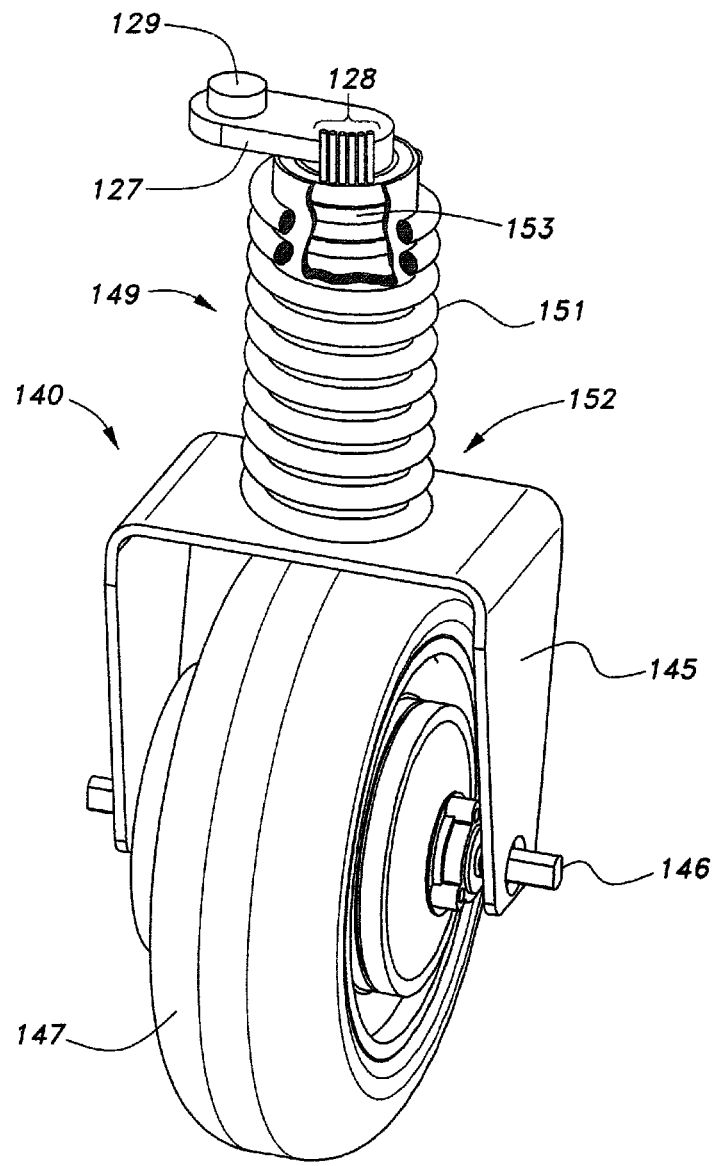
FIG. 1B illustrates a suspension system for each wheel of a simultaneous maneuvering system, according to the present invention.

Referring to FIGS. 1A and 1B, a first embodiment of the SMS, generally designated as 100a, is shown. The SMS 100a includes a base 105 having a primary pivot hole 110, a plurality of spaced secondary pivot holes 115, a steering assembly 120 rotatably mounted within the primary pivot hole 110 of the base 105, and a plurality of steering rotors 125 rotatably mounted in respective secondary pivot holes 115 of the base 105. The steering rotors 125 can have parallel axes of rotation. The SMS 100a includes a drive assembly 130 coupled to the steering assembly 120 and to each steering rotor 125. An actuator 135 is rotatably coupled to the steering assembly 120 for selectively rotating the steering assembly 120. Rotation of the steering assembly 120 forces movement or operation of the drive assembly 130 as a universal crank to drive all of the rotors 125 and corresponding wheels 147 simultaneously. The actuator 135 can be a linear actuator, such as a fluid actuator or a screw type actuator. The linear actuator can be a hydraulic or pneumatic actuator.

The wheels 147 can be a part of a wheel assembly including casters 140 attached to wheels. Each caster 140 can include a caster yolk 145, an axle 146 (FIG. 1B). Each wheel 147 can rotate about a corresponding axle 146. The axle 146 can be secured, such as bolted, to the yolk 145 to prevent the wheel 147 from disengaging from the caster 140. Each caster 140 includes a suspension system 149 having a coil spring 151 extending between the caster yolk 145 and the base 105. Each caster 140 is coupled to a respective one of the steering rotors 125, as illustrated in FIG. 1A. As is well known in the art, the SMS 100a can include a power source (not shown), such as an electric motor or fluid motor, to drive each wheels 147 of the SMS 100a. Each caster 140 may include a fluid swivel joint 152 for allowing each wheel 147 to rotate and electric rotary slip ring 153 positioned on the swivel joint 152. The slip ring 153 is configured for housing wires 128, such as electric wires or fluid hoses, extending from the power source.

The base 105 is a generally flat platform having a generally open central portion. Each steering rotor 125 includes an elongate crank arm 127 and an eccentric crank pin 129 projecting upward from one end of the corresponding crank arm 127. An opposite end of the crank arm 127 is coupled to the corresponding caster 140. The steering assembly 120 includes a steering arm 122, connecting the linear actuator 135 to the steering assembly 120. One end of the steering arm 122 is rotatably coupled to the linear actuator 135, and an opposite end thereof is attached to a pin 124 extending from the base 105.

The drive assembly 130 includes a drive frame 132 having a primary pivot hole 134 and a plurality of secondary pivot holes 136. The primary pivot hole is configured for receiving the pin 124 extending through the steering arm 122. The plurality of secondary pivot holes 136 are configured for receiving the corresponding crank pins 129. The drive frame 132, similar to the base 105, has a generally open central portion. It is to be noted that, as illustrated in the following embodiments, the general configuration of the base 105 and the corresponding drive frame 132 can be designed in any configuration. Regardless of the configuration of the base 105 and the corresponding drive frame 132, the rotors preferably have parallel axes of rotation. A distance between the axes of rotation of any pair of the rotors 125 can be kept constant. For simultaneous operation of the rotors 124, 125 in a same direction, a distance between corresponding pivot points on the drive frame 132 and the base 105 must be constant, and the wheels must be kept parallel. For example, the distance between adjacent pivot holes 136 in the drive frame 132 and corresponding adjacent pivot holes 115 in the base should be constant if simultaneous operation of all of the wheels in a same direction is desired. As long as this constant distance is maintained, the geometry of the base 105 and the corresponding drive frame 132 can be varied as desired.

The steering of each wheel 147 is facilitated by the selective movement of the steering assembly 120 and the linear actuator 135. When the linear actuator 122 is extended or retracted along its length, the steering assembly 120 steers the drive frame 132 of the drive assembly 130, which, in turn, steers each wheel 147 simultaneously in the same direction. For example, the linear actuator 122 can be moved within a specified range, such as a specified steering range, ranging from about −90° to +90°, since in the majority of cases unlimited continuous steering is not necessary.

Figure 2A:
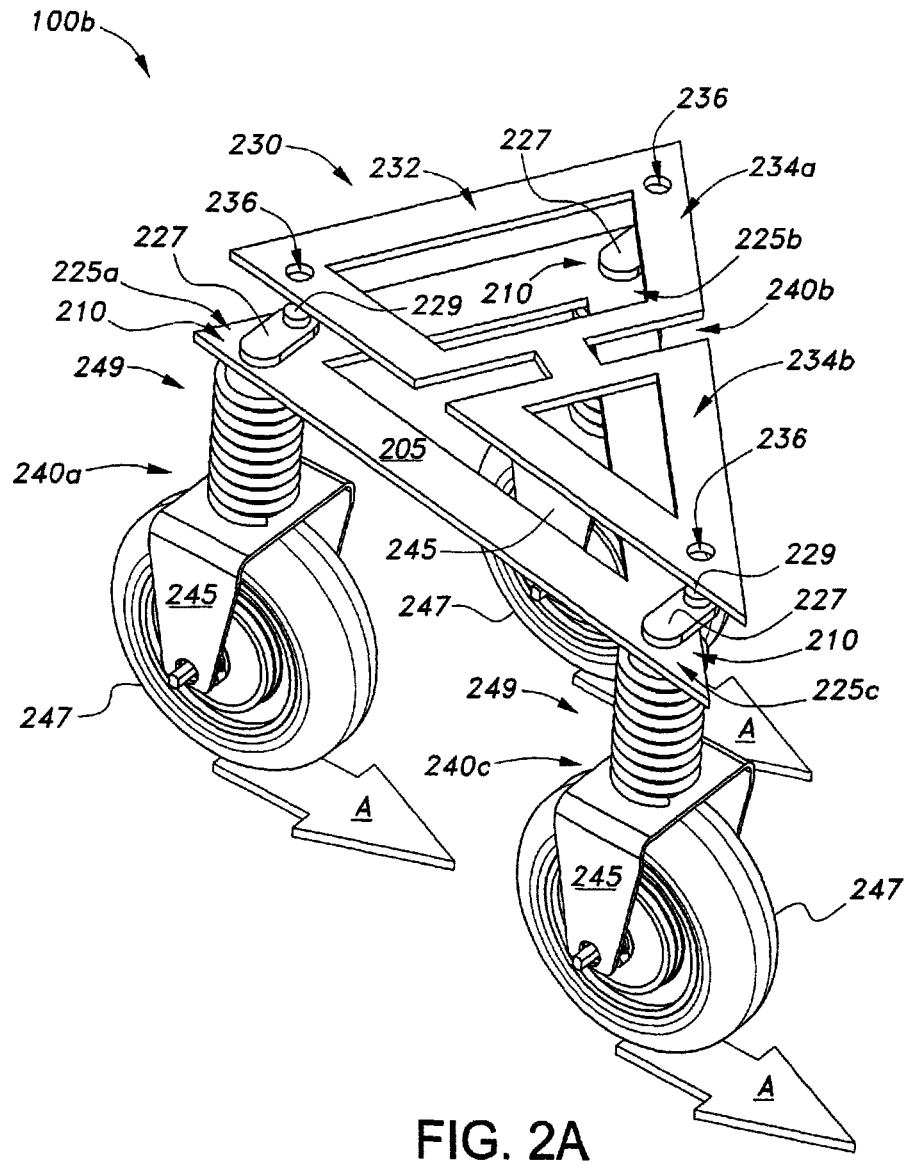
FIG. 2A is an environmental, perspective view of a second embodiment of a simultaneous maneuvering system, according to the present invention.
Figure 2B:
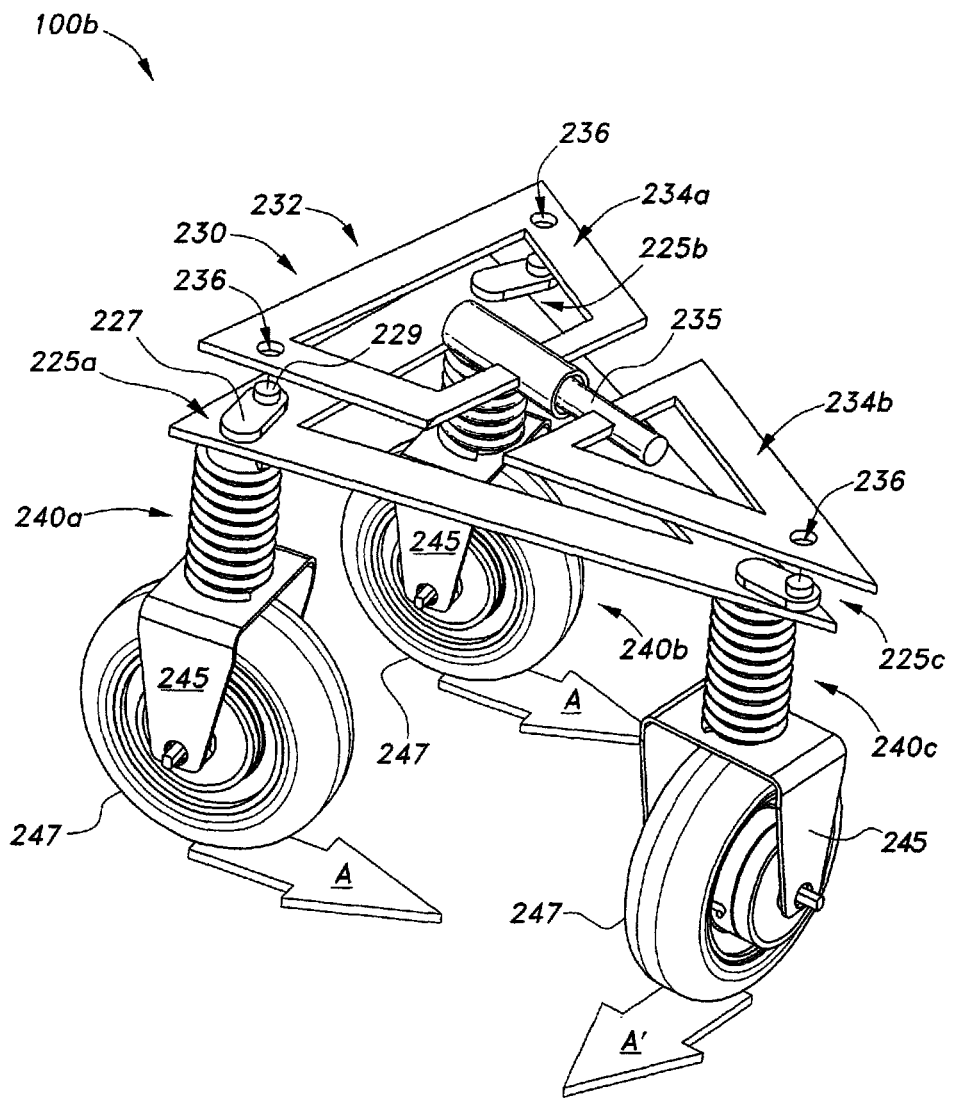
FIG. 2B illustrates the second embodiment of a simultaneous maneuvering system having a linear actuator, according to the present invention.

Referring to FIGS. 2A and 2B, a second embodiment of the SMS, generally designated as 100b, is shown. The SMS 100b is substantially similar to the SMS 100a described above. The SMS 100b, however, includes a base 205 having a generally triangular configuration. Similar to SMS 100a, a base 205 of SMS 100b includes a plurality of spaced pivot holes 210, a plurality of steering rotors, such as a first steering rotor 225a, a second steering rotor 225b, and a third steering rotor 225c, extending through a respective pivot hole 210 of the base 205, and a drive assembly 230. The SMS 100b includes a plurality of wheel assemblies each including a caster and a wheel 247 connected to the caster. The casters can include a first caster 240a, a second caster 240b, and a third caster 240c. Each caster 240a-240c can be coupled to a respective steering rotor 225a-225c. Similar to casters 145, each caster 240a-240c includes at least one wheel 247 and can include a suspension system 249 similar to the suspension assembly 149, as described above.

As in SMS 100a, the base 205 of SMS 100b is a generally flat platform and each steering rotor 225a-225c includes an elongate crank arm 227 and an eccentric crank pin 229 projecting upward from one end of the corresponding crank arm 227. The opposite end of the crank arm 227 is coupled to a corresponding one of the casters 240a-240c.

The drive assembly 230 of SMS 100b includes a drive frame 232 including a generally trapezoidal first portion 234a and a generally triangular second portion 234b. The first portion 234a and the second portion 234b can be directly connected as shown in FIG. 2B. The drive frame 232 includes a plurality of pivot holes 236, each pivot hole 236 configured for receiving a corresponding crank pin 229 therein. The first portion 234a of the drive frame 232 is coupled to the first steering rotor 225a and to the second steering rotor 225b while the second portion 234b of the drive frame 232b is coupled to the third steering rotor 232c. Both portions 234a, 234b of the drive frame 232 are coupled to a respective one of the steering rotors 225a-225c to steer the steering rotors 225a-225c simultaneously in the same direction. The distance between adjacent pivot holes 236 in the drive assembly 230 and corresponding pivot holes in the base can be equal. The wheels can be moved simultaneously in a parallel forward, direction, as illustrated by arrows A in FIG. 2A, or in a parallel, reverse direction, simultaneously.

Alternatively, as shown in FIG. 2B, the first portion 234a and the second portion 234b of the drive frame 232 may be coupled to each other via a linear actuator 235, similar to the linear actuator 135 of SMS 100a. The first portion 234a of the drive frame 232 is configured for driving the wheels 247 connected to the caster 240a and the caster 240b. The second portion 234b of the drive frame 232 is configured for driving the wheels 247 connected to caster 240c. When the linear actuator 235 is extended, the first portion 234a and the second portion 234b are moved further apart, which changes the distance between adjacent pivot points of the drive frame 232 and corresponding adjacent pivot points of the base 205. Accordingly, during movement, the wheels 247 connected to the first portion 234a of the drive frame 232 remain parallel to each other, as indicated by arrows A, while the wheel 247 connected to the second portion 234b of the drive frame 232 may turn in a direction that is different from the other two wheels, as illustrated by arrow A' in FIG. 2B. The different moving direction of this third wheel can create a resistance to the movement of the other two wheels, which may be desirable for braking and/or parking of a vehicle.

Figure 3:
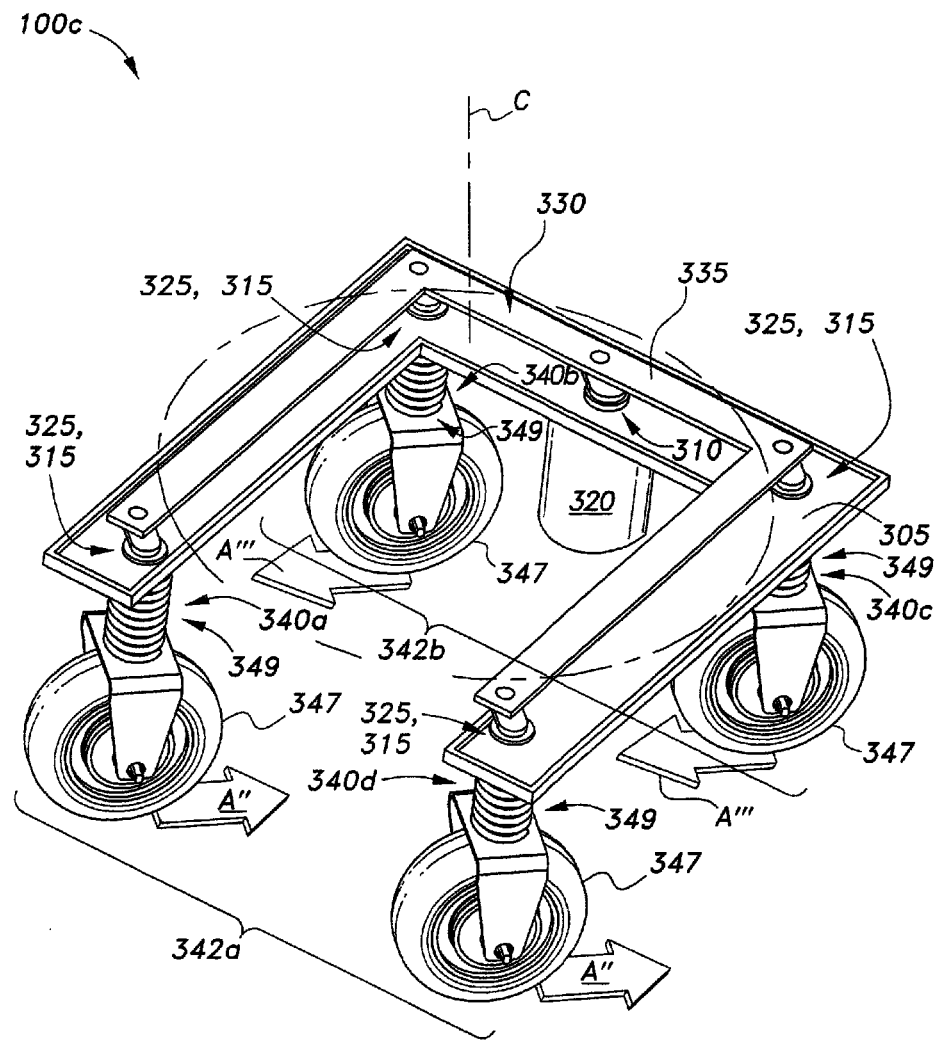
FIG. 3 is an environmental, perspective view of a third embodiment of a simultaneous maneuvering system, according to the present invention.

Referring to FIG. 3, a third embodiment of the SMS, generally designated as 100c, is shown. The SMS 100c is substantially similar to SMS 100a. The SMS 100c includes a base 305 having a primary pivot hole 310 and a plurality of secondary pivot holes 315, at least one actuator 320, such as a rotary actuator, being rotatably mounted within the primary pivot hole 310 of the base 305, and a plurality of steering rotors 325. Each steering rotor 325 is rotatably mounted within a respective secondary pivot hole 315 of the base 305. The SMS 100c further includes a drive assembly 330 having a drive frame 335 coupled to the actuator 320 and to each steering rotor 325 to selectively operate the steering rotors 325 simultaneously, as discussed above in regards to SMS 100a.

Similar to the SMS 100a, the SMS 100c includes a plurality of wheel assemblies, each including a caster and a wheel 347. The SMS 100c can include a first caster 340a, a second caster 340b, a third caster 340c, and a fourth caster 340d. The first caster 340a and the fourth caster 340d make up a first set of wheel assemblies 342a. The second caster 340b and the third caster 340c make up a second set of wheel assemblies 342b. It is to be noted that similar to SMS 100a, each caster 340a-340d can include a suspension system 349 similar to the suspension assembly 149, as described above. The drive assembly can be connected to the rotors 325 such that movement of the drive assembly can simultaneously crank the rotors associated with the first set of wheel assemblies 342a in a different direction from that of the second set of wheel assemblies 342b. Thus, the at least one actuator 320 having bilateral rotations controlled by an electric switch, for example, can be operated to orient the wheels 347 of the first set of wheel assemblies 342a of SMS 100c in a first direction, such as in a forward direction, as indicated by arrow A," and the wheels 347 of the second set of wheel assemblies 342b can be orientated in a direction opposite the first direction, such as in a rear direction, as indicated by arrow A'''. Despite their orientation, the wheels 347 of both sets of wheel assemblies 342a, 342b are maintained parallel to one another. This arrangement allows the torque generated by the reverse resistance forces acting on the wheels 347 and their contact surface to rotate the SMS 100c on the ground, such as about the central vertical axis C of the SMS 100c.

Figure 4:
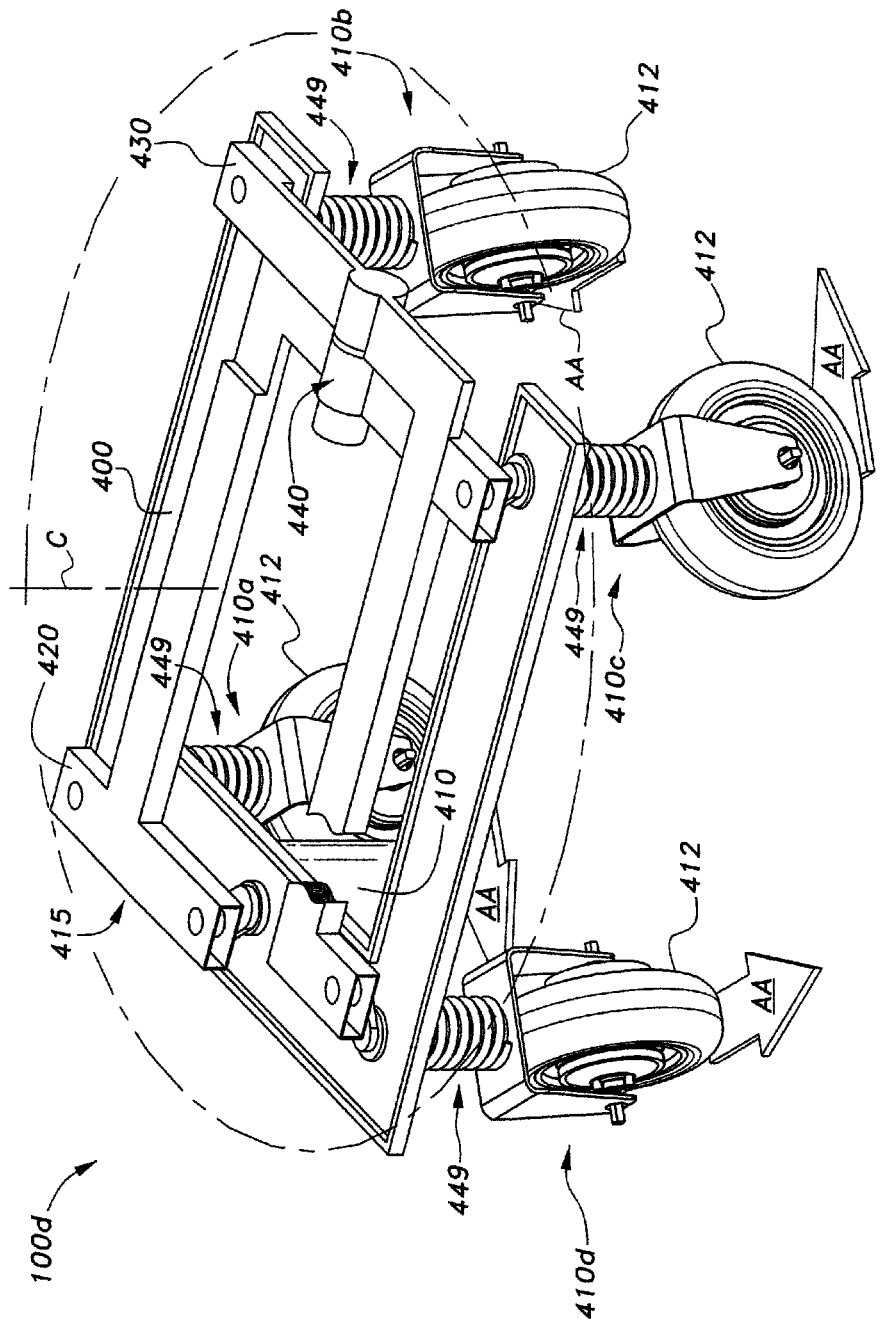
FIG. 4 is an environmental, perspective view of a fourth embodiment of a simultaneous maneuvering system, according to the present invention.

Referring to FIG. 4, a fourth embodiment of the SMS, generally designated as 100d, is shown. The SMS 100d is substantially similar to the SMS 100a. The SMS 100d, however, includes a base 400 having a generally rectangular configuration, an actuator 410 mounted onto the base 400, the actuator 410, e.g., a rotary actuator, configured for driving the SMS 100d in a predetermined direction, and a drive assembly 415 having a first drive frame 420 and a second drive frame 430.

The first drive frame 420 and the second drive frame 430 are both connected to the base 400 in a similar fashion as the drive assembly 130 and the base 105 are connected to one another in SMS 100a. The first drive frame 420 and the second drive frame 430 are connected to one another via a linear actuator 440, so that the position of the first drive frame 420 is adjustable relative to the position of the second drive frame 430. Similar to SMS 100a, SMS 100d includes a plurality of casters, such as a first caster 410a, a second caster 410b, a third caster 410c, and a fourth caster 410d. Each caster 410a-410d includes at least one wheel 412 and a suspension system 449 similar to the suspension assembly 149, described above. The first drive frame 420 is coupled to two diagonally opposed casters, such as caster 410a and caster 410c. The second drive frame 430 is coupled to two other diagonally opposed casters, such as caster 410b and caster 410d.

The steering of the SMS 100d is facilitated by the selective movement of the linear actuator 440, such as in an inward and an outward direction. As the linear actuator 440 drives the first drive frame 420 and the second drive frame 430 (e.g. the diagonal links), diagonally opposed wheels can move parallel, but opposite in opposite directions to permit movement of the SMS 100d in a perfect circle about the center of rotation C, as illustrated by arrows AA. The wheels 412 on each caster 410a-410d rotate simultaneously and at the same speed.

Figure 5A:
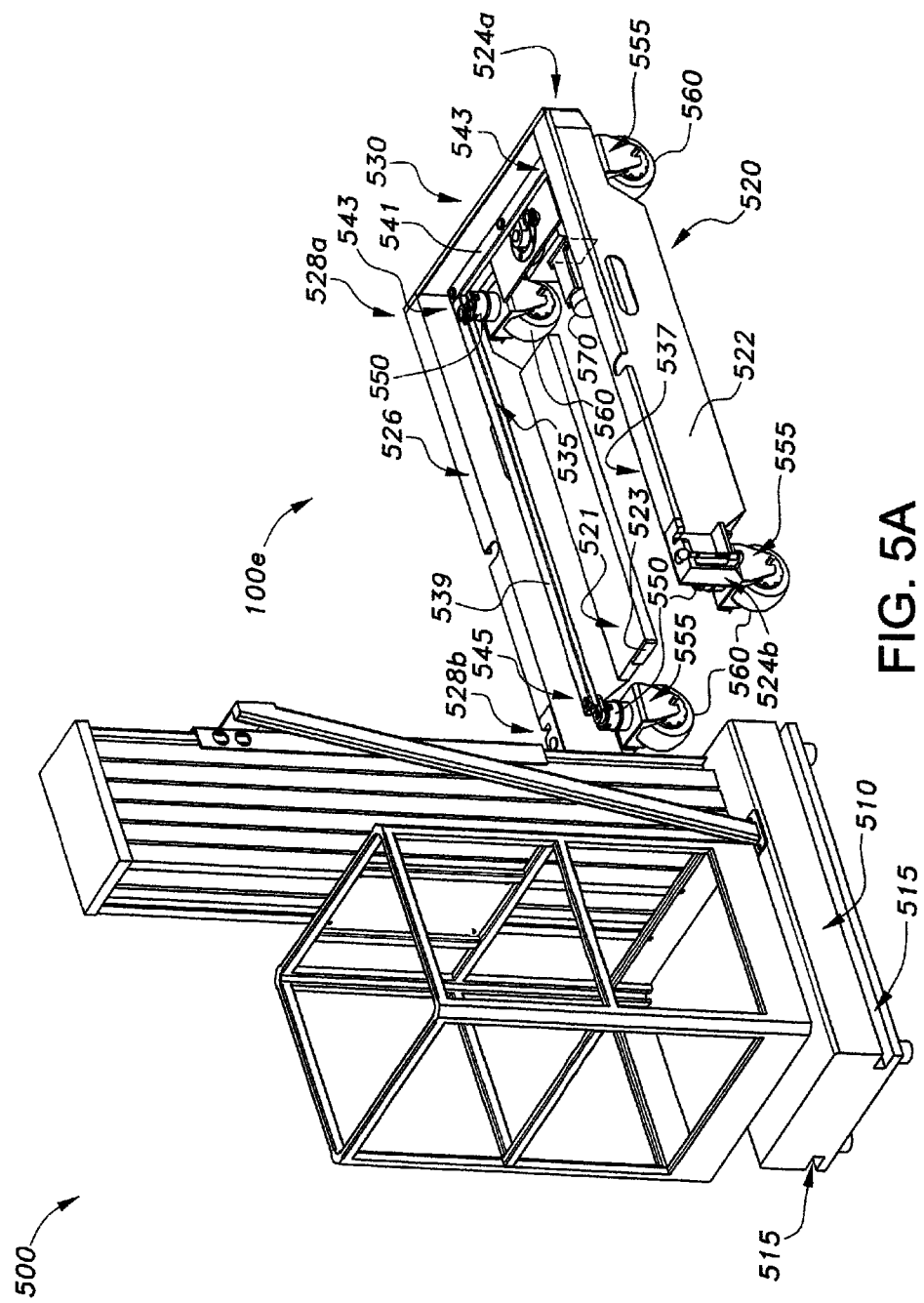
FIG. 5A is an environmental, perspective view of a fifth embodiment of a simultaneous maneuvering system, according to the present invention.
Figure 5B:
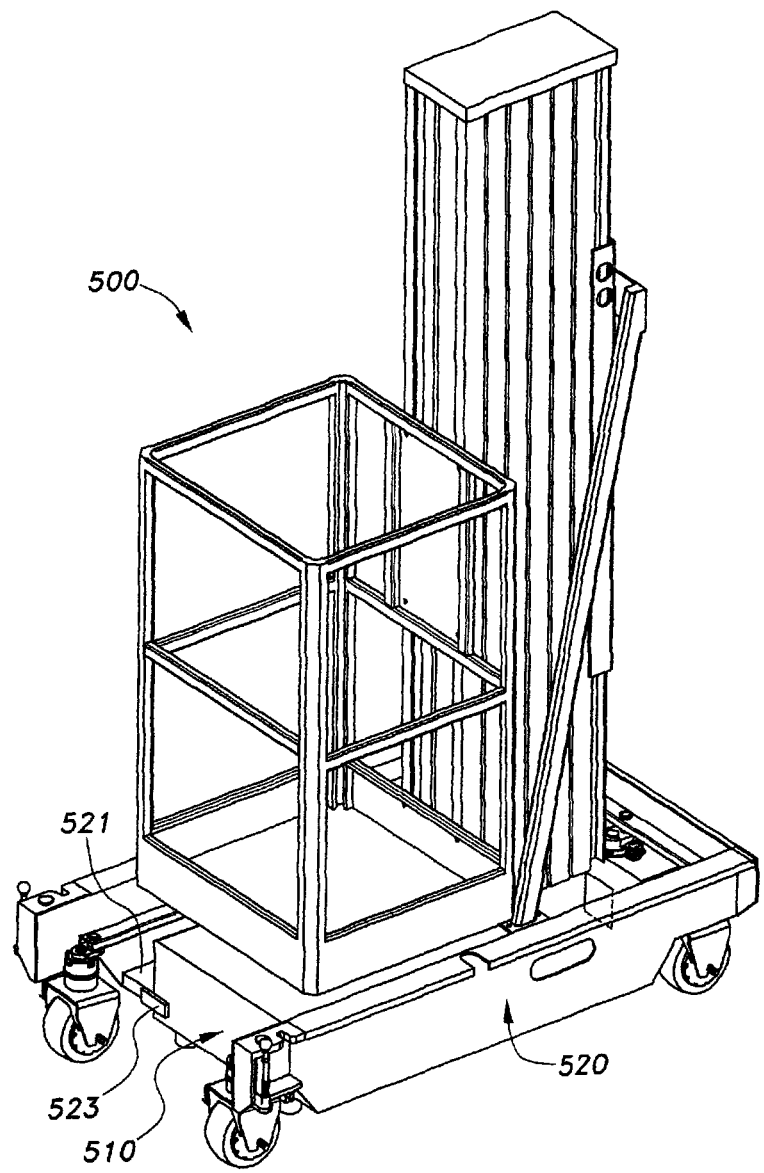
FIG. 5B illustrates the fifth embodiment of a simultaneous maneuvering system positioned beneath a non-powered working machine, according to the present invention.
Figure 5C:
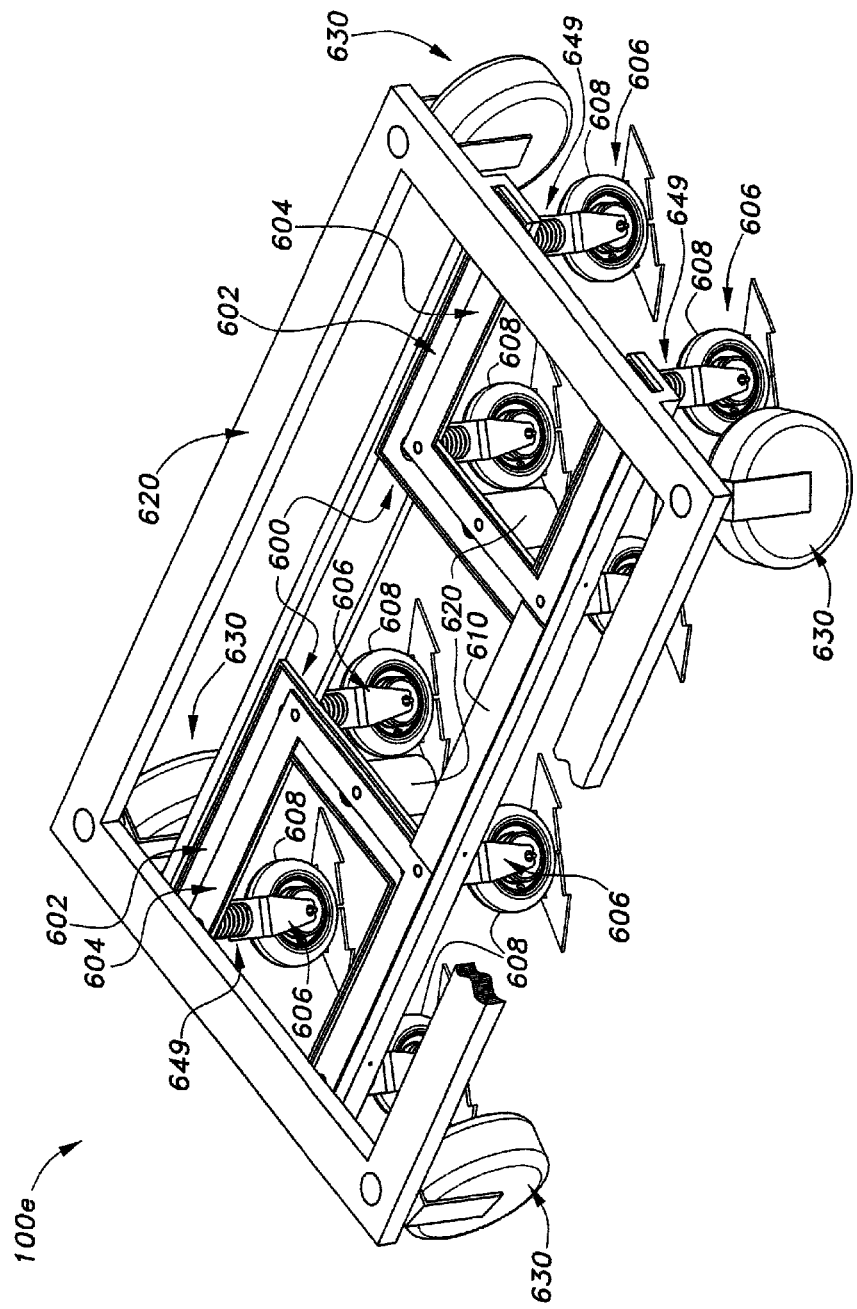
FIG. 5C illustrates a plurality of simultaneous maneuvering systems positioned within a non-self-propelled carrying frame, according to the present invention.

Referring to FIGS. 5A-5C, a fifth embodiment of the SMS, generally designated as 100e, is shown. The SMS 100e, also referred to herein as the SMS towing tractor, is substantially similar to the SMS 100a and is configured for moving a non-powered working machine 500, e.g., a non-propelled mask lift platform. The machine 500 includes a base 510 having at least two open slots 515 defined lengthwise along opposing sides of the base 510, as illustrated in FIG. 5A. The SMS 100e can be attached to the base 510 of the non-powered working machine 500, as illustrated in FIG. 5B.

The SMS 100e is substantially similar to the SMS 100a except that the SMS 100e includes a carrying frame 520 having an open, generally rectangular configuration, including a first side 522 having a front portion 524a and a rear portion 524b, a second side 526 having a front portion 528a and a rear portion 528b, and a third side 530 extending between and connecting the front portion 524a of the first side 522 and the the front portion 528a of the second side 526. The carrying frame 520 of the SMS 100e includes a pair of guides 521 extending from inner surfaces of the first side 522 and second side 524 of the carrying frame 520. Each guide 521 is configured for sliding into a corresponding one of the open slots 515 of the base 510 of the non-powered working machine 500. Further, each guide 521 includes a locking mechanism 523, such as a locking latch, to secure the base 510 of the non-powered working machine 500 to the SMS 100e, as illustrated in FIG. 5B.

Also, the SMS 100e includes a drive frame 535 having at least two primary ledges, such as a first primary ledge 537 and a second primary ledge 539 positioned lengthwise along facing, inner surfaces of the first side 522 and the second side 526. Each primary ledge 537 and 539 has a front portion 543 and a rear portion 545. A secondary ledge 541 is positioned along an inner surface of the third side 530 of the carrying frame 520. The secondary ledge 541 connects the front ends 543 of each primary ledge 537, 539.

Steering rotors 550 are rotatably mounted to ends of each primary ledge 537, 539. Casters 555 are positioned on the perimeter of the carrying frame 520, such that each caster 555 is coupled to a respective steering rotor 550. Each caster 555 includes at least one wheel 560. A motor assembly 570 is positioned on the secondary ledge 539 of the drive assembly 535. The motor assembly 570 is configured for driving the SMS 100e in a desired direction, such as in a forward direction or in a reverse direction.

By way of operation, the non-powered working machine 500 can be connected to the SMS 100e by inserting each guide 521 of the carrying frame 520 into one of the corresponding slots 515 alongside the base 510 of the non-powered working machine 500, as illustrated in FIG. 5B. After the non-powered working machine 500 and the carrying frame 520 of the SMS 100e are attached to each other, the locking mechanism 523 can be activated to prevent the non-powered working machine 500 from disconnecting from the carrying frame 520.

Alternatively, as illustrated in FIG. 5C, the SMS 100e can include a plurality of SMS units 600 mounted to one carrying frame. For example, each of the SMS units 600 can be positioned within a non-self-propelled carrying frame 620 having a plurality of rotating perimeter wheels 630. Each SMS unit 600 can be substantially similar to SMS 100c, described above. The driving frame of the SMS units 600 can be connected to one another by a bar 610 to allow simultaneous spinning of the wheels on all of the SMS units 600 by operation of a single actuator. Each SMS unit 600 includes a base 602 and a plurality of wheel assemblies including casters 606 rotatably coupled to the base 602, a drive frame 604 configured for steering each caster 606 simultaneously in the same direction, similar to SMS 100a, and an actuator 620, e.g., a rotary actuator. Each caster 606 has at least one wheel 608 and can include a suspension system 649 similar to the suspension assembly 149 described above. The SMS units 600 can be inserted into the non-self-propelled carrying frame 620 in a manner similar to how the base 510 of the non-powered working machine 500 is inserted into the carrying frame 520, as illustrated in FIGS. 5A and 5B. As each SMS unit 600 is coupled to the bar 610, each wheel 608 on each corresponding caster 606 of each SMS unit 600 can be oriented parallel to one another and simultaneously rotated. As with the SMS 100c, described above, the SMS unit 600 can be configured such that the wheels 608 on one SMS unit 600 can be driven in a first direction, such as in a forward direction, while the wheels 608 on another SMS unit 600 are driven in a direction opposite the first direction, such as in a reverse direction. This configuration allows the non-self-propelled carrying frame 620 to rotate about the vertical center of the non-self-propelled carrying frame 620.

Figure 6:
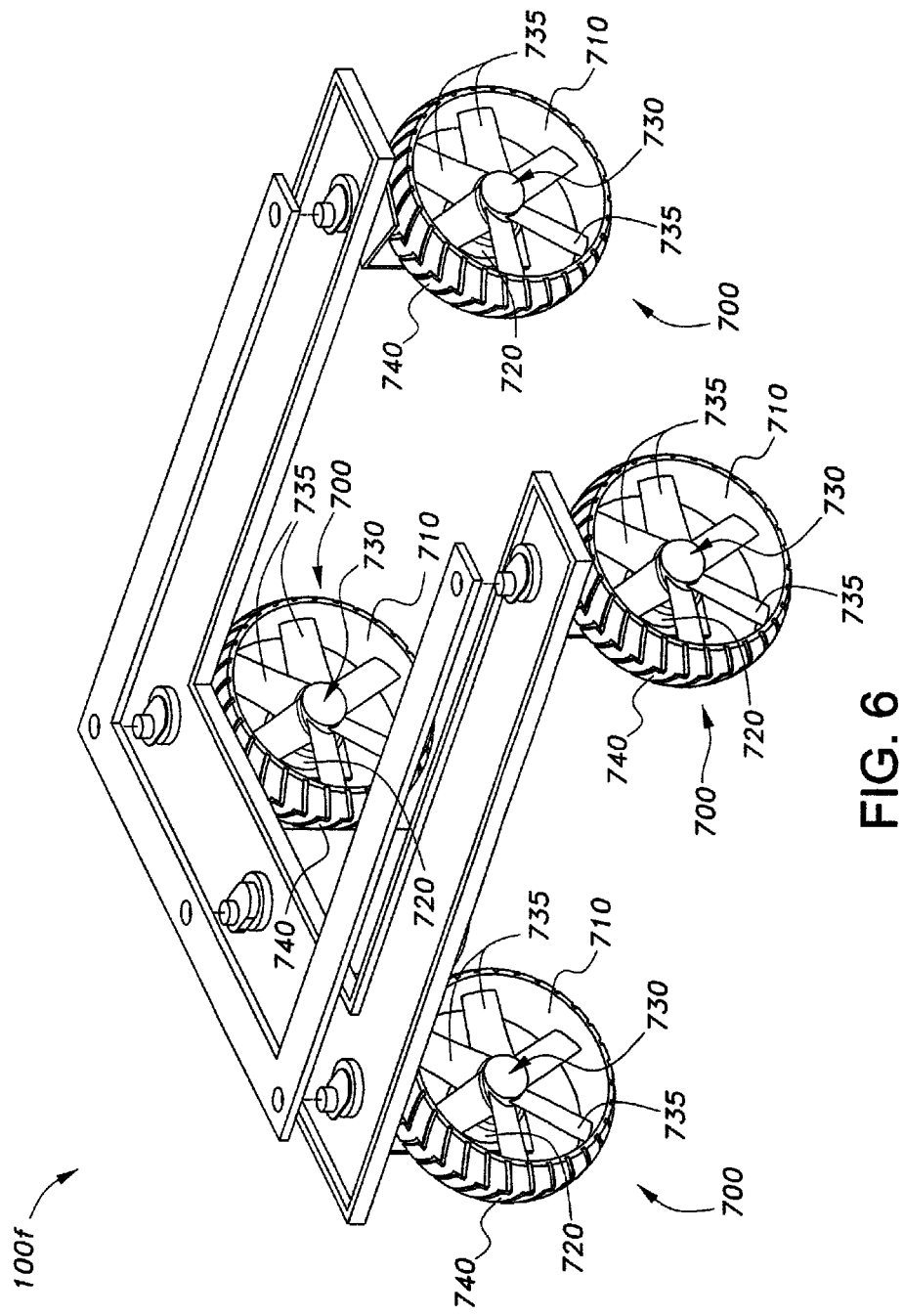
FIG. 6 is an environmental, perspective view of a sixth embodiment of a simultaneous maneuvering system, according to the present invention.

Referring to FIG. 6, a sixth embodiment of the SMS, generally designated as 100f, is shown. The SMS 100f, is substantially similar to the SMS 100a including a plurality of wheel assemblies 700 having at least one wheel 710. Each wheel assembly 700 of SMS 100f, however, includes a rotation actuator 720, such as a self-propelled water-proof rotation actuator, configured for rotating a respective wheel 710 of the wheel assembly 700 to maintain maneuverability of the SMS 100f either on land or in the water. Further, each wheel 710 of each wheel assembly 700 includes a propeller spoke system 730 having a plurality of spokes 735. All of the wheels 710 with their corresponding rotation actuators 720 are joined to the base of the SMS 100f and the rotors are simultaneously driven by the driving frame, as described above for SMS 100a. A tire 740 may be positioned around each wheel 710 to provide traction.

When the SMS 100f travels on land, the wheels 710 are parallel to the desired direction of travel. Upon entering the water, the wheels 710 are adjusted to be perpendicular to the direction of travel, with the wheels and the propellers moving simultaneously and parallel to one another. When the SMS 100f leaves the water, the process is reversed. It is to be noted that each of the wheels 710 should always rotate at the same speed, regardless of whether the SMS 100f is on land or in the water. As such, the SMS 100f can be installed on any machine that needs to be moved by land or water. In the instance in which the SMS 100f is installed on an amphibious carrier, such as a boat or other type of water vehicle, it is the floatation of amphibious carrier that keeps the SMS 100f from sinking.

It is to be understood that the present invention is not limited to the embodiments described above, but encompasses any and all embodiments within the scope of the following claims.

We claim:

1. A simultaneous maneuvering system for vehicles, the system comprising:
    a base;
    a plurality of wheel assemblies rotatably mounted to the base, each wheel assembly having at least one wheel, a fluid swivel joint for allowing the at least one wheel to rotate, and an electric rotary slip ring positioned on the fluid swivel joint, the electric rotary slip ring configured for housing wires extending from a power source; wherein each of the plurality of wheel assemblies comprises a suspension system having a coil spring extending between each wheel assembly and the base;
    a plurality of steering rotors rotatably mounted to the base, each steering rotor having a crank arm and an eccentric crank pin at a first end of each crank arm, a second end of each crank arm being coupled to a corresponding one of the plurality of wheel assemblies;
    a drive assembly having a drive frame coupled to each crank pin; and
    at least one actuator configured for selectively operating the drive assembly to simultaneously rotate the steering rotors.

2. The simultaneous maneuvering system for vehicles according to claim 1, further comprising a steering assembly rotatably coupled to the drive assembly and the actuator for selectively steering the simultaneous maneuvering system.

3. The simultaneous maneuvering system for vehicles according to claim 1, wherein the rotors have parallel axes of rotation and a distance between axes of rotation of any pair of rotors is constant.

4. The simultaneous maneuvering system for vehicles according to claim 1, wherein the drive frame includes at least a first portion positioned in communicating relation with a first wheel assembly and at least a second portion positioned in communicating relation with a second wheel assembly.

5. The simultaneous maneuvering system for vehicles according to claim 4, wherein at least the first portion and at least the second portion of the drive frame are connected to one or more actuators, whereby the one or more actuators are configured to adjust at least a position of the first and second portions relative to each other, resulting in non-parallel positioning of at least one wheel with respect to two other wheels.

6. The simultaneous maneuvering system for vehicles according to claim 1, wherein the drive frame of the drive assembly comprises at least a first drive frame and at least a second drive frame, at least the first drive frame and the second drive frame being connected by the at least one actuator, the first drive frame being positioned in communicating relation with two diagonally opposed wheel assemblies and the second drive frame being positioned in communicating relation with two other diagonally opposed wheel assemblies, wherein at least the first and second drive frames are configured to position diagonally opposed wheels parallel to one another and adjacent wheels perpendicular to one another to achieve self-center rotation.

7. The simultaneous maneuvering system for vehicles according to claim 1, wherein the at least one actuator is a linear actuator.

8. The simultaneous maneuvering system for vehicles according to claim 7, wherein linear actuator comprises a fluid actuator.

9. The simultaneous maneuvering system for vehicles according to claim 8, wherein the fluid actuator is selected from the group consisting of hydraulic actuators, pneumatic actuators, and a combination thereof.

10. The simultaneous maneuvering system for vehicles according to claim 7, wherein the linear actuator comprises a screw type actuator.

11. The simultaneous maneuvering system for vehicles according to claim 1, wherein the at least one actuator is a rotation actuator.

12. The simultaneous maneuvering system for vehicles according to claim 11, wherein each wheel assembly includes a rotation actuator and the at least one wheel of each wheel assembly comprises a propeller spoke system having a plurality of spokes, each spoke having a propeller configuration.

13. A simultaneous maneuvering system for vehicles, the system comprising:
    a carrying frame having a plurality of wheels
    a plurality of simultaneously maneuvering system units attached to the carrying frame, each simultaneous maneuvering system unit, comprising:
        a base;
        a plurality of wheel assemblies rotatably mounted to the base, each wheel assembly having at least one wheel, a fluid swivel joint for allowing the at least one wheel to rotate, and an electric rotary slip ring positioned on the fluid swivel joint, the electric rotary slip ring configured for housing wires extending from a power source; wherein each of the plurality of wheel assemblies comprises a suspension system having a coil spring extending between each wheel assembly and the base;
        a plurality of steering rotors rotatably mounted to the base, each steering rotor having a crank arm and an eccentric crank pin at a first end of each crank arm, a second end of each crank arm being coupled to a corresponding one of the plurality of wheel assemblies;
a drive assembly having a drive frame coupled to each crank pin; and
at least one actuator configured for selectively operating the drive assembly to simultaneously crank the steering rotors.

14. The simultaneous maneuvering system for vehicles according to claim 13, wherein the drive assembly of each simultaneously maneuvering system is connected to a common rigid support.

\* \* \* \* \*